US009718347B2

(12) United States Patent
Kito et al.

(10) Patent No.: US 9,718,347 B2
(45) Date of Patent: Aug. 1, 2017

(54) FUELING DEVICE

(71) Applicant: TOYODA GOSEI CO., LTD., Kiyosu-shi, Aichi-ken (JP)

(72) Inventors: Hiroaki Kito, Kiyosu (JP); Yoshinari Hiramatsu, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 57 days.

(21) Appl. No.: 14/303,638

(22) Filed: Jun. 13, 2014

(65) Prior Publication Data
US 2015/0001215 A1 Jan. 1, 2015

(30) Foreign Application Priority Data

Jun. 27, 2013 (JP) .................................. 2013-134392
Mar. 24, 2014 (JP) .................................. 2014-59909

(51) Int. Cl.
*B60K 15/04* (2006.01)

(52) U.S. Cl.
CPC ........ *B60K 15/04* (2013.01); *B60K 2015/047* (2013.01); *B60K 2015/0429* (2013.01); *B60K 2015/0461* (2013.01)

(58) Field of Classification Search
CPC ............... B60K 15/04; B60K 205/047; B60K 2015/0461
USPC ......................................................... 141/350
See application file for complete search history.

(56) References Cited

U.S. PATENT DOCUMENTS

| | | | | | |
|---|---|---|---|---|---|
| 2,311,708 | A | * | 2/1943 | Sundholm | F16K 3/085 137/320 |
| 2,534,003 | A | * | 12/1950 | Culver | F01P 11/0214 220/231 |
| 5,829,495 | A | | 11/1998 | Corfitsen | |
| 5,921,297 | A | * | 7/1999 | Kremer | B60K 15/04 141/301 |
| 8,096,332 | B2 | * | 1/2012 | Hagano | B60K 15/04 141/285 |

(Continued)

FOREIGN PATENT DOCUMENTS

| | | | |
|---|---|---|---|
| JP | S56-64821 U | | 5/1981 |
| JP | 6087721 U | * | 6/1985 |

(Continued)

*Primary Examiner* — Allana Lewin Bidder
*Assistant Examiner* — James Hakomaki
(74) *Attorney, Agent, or Firm* — Posz Law Group, PLC

(57) ABSTRACT

A fueling device comprises a passage-forming member, an opening-forming member configured to form an opening, a filler port open-close mechanism that includes an open-close member configured to open and close the opening, a screwing mechanism that includes an outer circumferential threaded section and an inner circumferential threaded section and a gasket placed between the opening-forming member and the passage-forming member to seal between the opening-forming member and the passage-forming member, wherein the outer circumferential threaded section is provided on outer periphery of the passage-forming member, the inner circumferential threaded section is provided on the opening-forming member and screwed to the outer circumferential threaded section, the opening-forming member is attached to the passage-forming member by screwing the outer circumferential threaded section to the inner circumferential threaded section.

10 Claims, 9 Drawing Sheets

(56) References Cited

U.S. PATENT DOCUMENTS

| | | | | |
|---|---|---|---|---|
| 2009/0001077 A1* | 1/2009 | Feichtinger | ............ | B60K 15/04 220/86.2 |
| 2009/0189106 A1* | 7/2009 | Hagano | .............. | B60K 15/0406 251/147 |
| 2011/0079322 A1* | 4/2011 | Beier | ................. | B60K 15/0406 141/350 |
| 2013/0075395 A1* | 3/2013 | Hagano | .............. | B60K 15/0406 220/86.2 |
| 2013/0075399 A1* | 3/2013 | Hagano | .............. | B60K 15/0406 220/254.3 |

FOREIGN PATENT DOCUMENTS

| | | |
|---|---|---|
| JP | S62-125917 A | 6/1987 |
| JP | H10-503994 A | 4/1998 |
| JP | 2013-71504 A | 4/2013 |

* cited by examiner

FUELING DEVICE

CROSS REFERENCE TO RELATED APPLICATIONS

The present application claims the priority based on Japanese Patent Applications No. 2013-134392 filed on Jun. 27, 2013 and No. 2014-59909 filed on Mar. 24, 2014, the disclosures of which are hereby incorporated by reference in its entirety.

BACKGROUND OF THE INVENTION

Technical Field

The present invention relates to a fueling device having a fuel passage to introduce a fuel to a fuel tank.

Description of Related Art

A known configuration of a prior art fueling device includes a pipe main body made of a resin, a filler port-forming member attached to the inside of the pipe main body, a first flap valve configured to open and close a filler port formed in the filler port-forming member, a cover member configured to cover these components and a second flap valve configured to open and close an opening of the cover member (for example, JP 2013-71504A). For assembly of the fueling device, the filler port-forming member is attached to the pipe main body, and the cover member is then assembled with the pipe main body. The cover member and the pipe main body are assembled by engagement of engagement claws respectively provided on the cover member and the pipe main body.

SUMMARY OF INVENTION

In such a fueling device, the cover member needs to be removed from the pipe main body, for example, when there is a damage in the cover member or when repair of the first flap valve is needed. The cover member is, however, fastened to the pipe main body by the mechanism such as the engagement claws. Secure attachment of the cover member makes its removal troublesome. Attachment of the cover member in an easily removable manner, on the other hand, causes the cover member to be detached easily by, for example, collision of a vehicle and additionally has difficulty in ensuring the high sealing property.

In order to solve at least part of the problems described above, the invention may be implemented by the following aspects or applications.

According to one aspect of the invention, there is provided a fueling device configured to supply a fuel to a fuel tank. The fueling device comprises an opening-forming member configured to form an opening that constitutes part of the fuel passage, a filler port open-close mechanism attached to the opening-forming member in an openable and closable manner, the filler port open-close mechanism including an open-close member configured to open and close the opening, a screwing mechanism that includes an outer circumferential threaded section and an inner circumferential threaded section, and a gasket placed between the opening-forming member and the passage-forming member to seal between the opening-forming member and the passage-forming member, wherein the outer circumferential threaded section is provided on outer periphery of the passage-forming member, the inner circumferential threaded section is provided on the opening-forming member and screwed to the outer circumferential threaded section, and the opening-forming member is attached to the passage-forming member by screwing the outer circumferential threaded section to the inner circumferential threaded section. In the fueling device of this aspect, the opening-forming member assembled with the filler port open-close mechanism is screwed to the passage-forming member via the screwing mechanism. This enables the filler port open-close mechanism with the opening-forming member to be readily removed from the passage-forming member, for example, in the event of a failure or a damage of the filler port open-close mechanism.

According to another aspect, the fueling device further comprises a thread-forming member attached to the passage-forming member, wherein the thread-forming member has the outer circumferential threaded section.

According to another aspect, the fueling device further comprises a thread-forming member attached to the opening-forming member, wherein the thread-forming member has the inner circumferential threaded section.

DESCRIPTION OF EMBODIMENTS

A. First Embodiment (1) General Structure of Fueling Device

Figure 1:
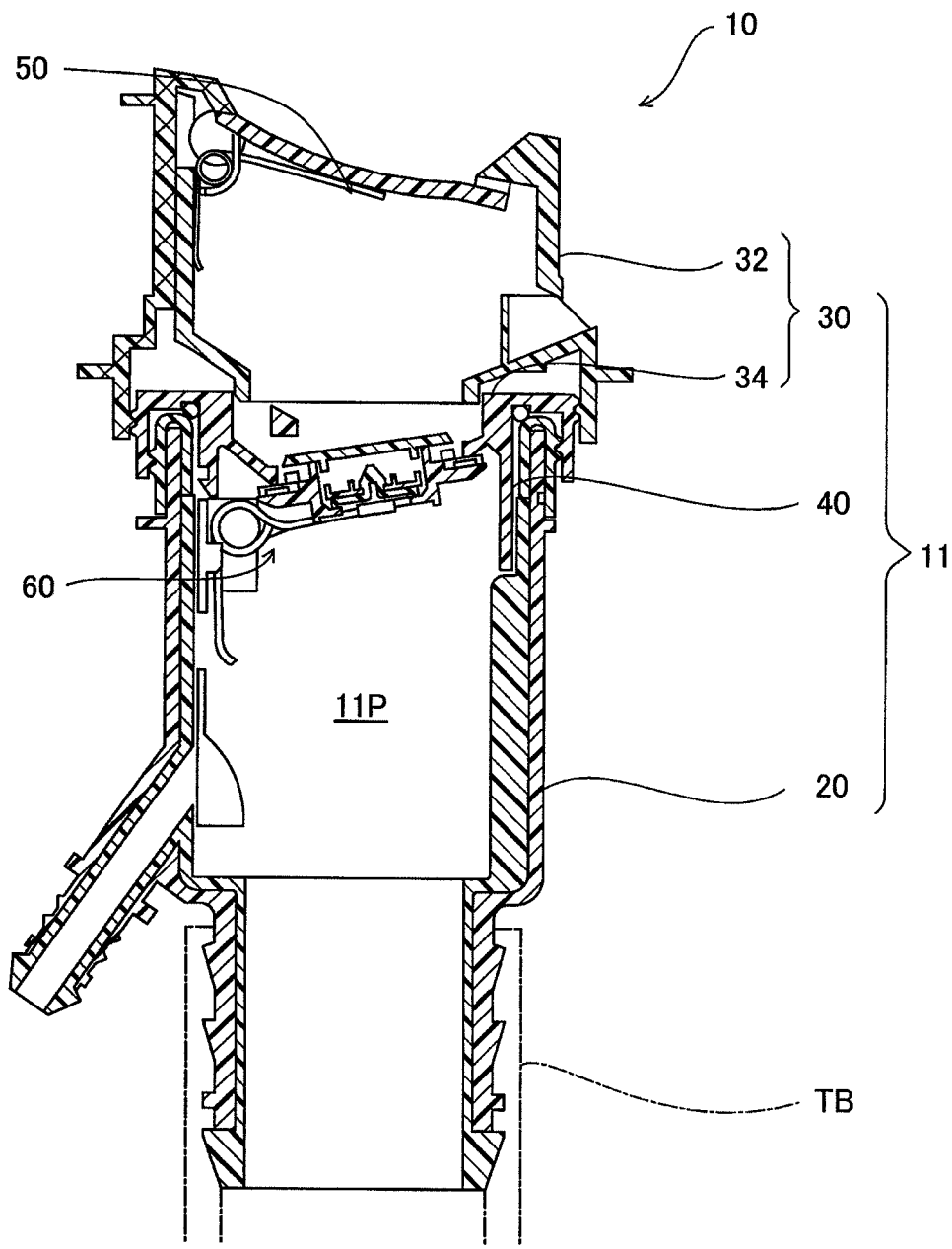
FIG. 1 is a cross sectional view illustrating a fueling device 10 using a filler neck according to a first embodiment of the invention.

FIG. 1 is a cross sectional view illustrating a fueling device 10 using a filler neck according to a first embodiment of the invention. In FIG. 1, the fueling device 10 includes a tank opening-forming member 11 having a fuel passage 11P which connects with a fuel tank (not shown), an insertion-side open-close mechanism 50 and a filler port open-close mechanism 60. In the fueling device 10, the insertion-side open-close mechanism 50 and the filler port open-close mechanism 60 are press-opened by a refueling nozzle (not shown) to inject fuel from the refueling nozzle into the fuel passage 11P. The fuel is then fed through the fuel passage 11P into the fuel tank. The following describes the structures of the respective components.

(2)-1 Structure of Tank Opening-Forming Member 11

The tank opening-forming member 11 is a tubular body defining the fuel passage 11P and includes a passage-forming member 20, a first opening-forming member 30 and a second opening-forming member 40.

Figure 2:
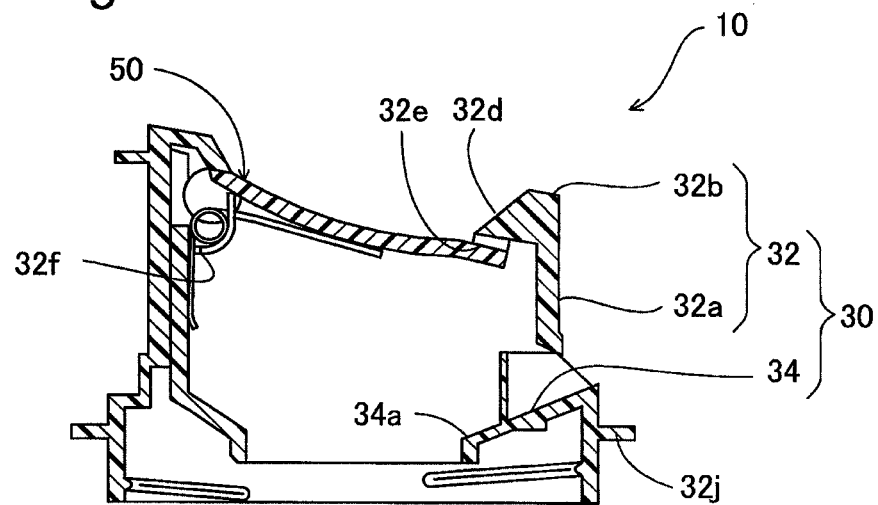
FIG. 2 is a partially exploded cross sectional view illustrating the fueling device 10.
Figure 2:
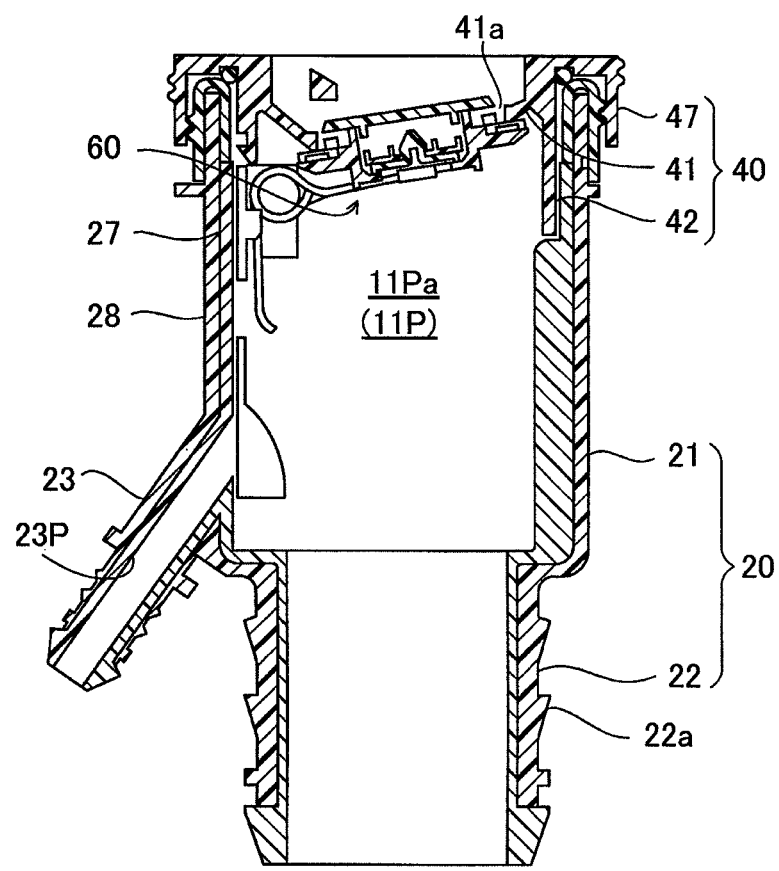

FIG. 2 is a partially exploded cross sectional view illustrating the fueling device 10. The passage-forming member 20 is formed by stacking two different resin materials and includes a cylindrical neck body 21, a neck connector 22 and a breather tube 23. The neck connector 22 is a cylindrical body of a reduced diameter integrally formed with a lower portion of the neck body 21 to constitute part of the fuel passage 11P and has a ring projection 22a on its outer periphery. Insertion of a tube TB (FIG. 1) into the neck connector 22 causes the tube TB to be connected with the neck connector 22 in the state that the ring projection 22a prevents the tube TB from being slipped off. The breather tube 23 is a tubular body branched off from a side wall of the neck body 21 and forms a breather passage 23P inside thereof. The breather passage 23P is connected with the fuel tank to introduce the fuel vapor in the fuel tank back to the neck body 21 during fueling and thereby ensure smooth fueling.

The passage-forming member 20 is formed by stacking two different resin materials and more specifically includes a resin inner layer 27 on the fuel passage 11P-side and a resin outer layer 28 stacked on the outer surface of the resin inner layer 27. The resin inner layer 27 is made of a resin material having excellent fuel permeation resistance, for example, polyamide (PA) such as nylon or ethylene vinyl alcohol copolymer (EVOH) and mainly serves as a barrier layer suppressing permeation of fuel. The resin outer layer 28 is made of a resin material having excellent mechanical strength, for example, polyethylene (PE) and mainly serves as a layer ensuring the mechanical strength and the impact resistance of the passage-forming member 20. In an application using polyethylene for the resin outer layer 28, a resin material modified with maleic acid as polar functional group (modified polyethylene) may be used. The modified polyethylene is joined with PA by chemical bonding to adhere to the resin inner layer 27.

The first opening-forming member 30 includes a cover member 32. The cover member 32 is mounted on the passage-forming member 20 and includes a cylindrical side wall section 32a and a top wall 32b. The side wall section 32a has a sloped upper portion, which is integrated with the upper wall 32b. The upper wall 32b has an opening structure 32d which the refueling nozzle is inserted through. The opening structure 32d has a first opening 32e and a shaft support 32f. The first opening 32e is in an almost circular shape for insertion of the refueling nozzle and constitutes part of the fuel passage 11P. The shaft support 32f is formed on the inner wall of the side wall section 32a and is provided as a part which an end of the insertion-side open-close mechanism 50 is mounted on and supported by.

A passage-forming member 34 is formed inside the cover member 32. The passage-forming member 34 is a member serving to define an insertion passage 11Pa as part of the fuel passage 11P which the refueling nozzle is inserted through and is guided by, and has an inclined wall 34a. The inclined wall 34a is in a conical shape tapered to narrow the passage area toward the fuel tank side.

The second opening-forming member 40 is a member serving to support the filler port open-close mechanism 60 and includes an opening structure 41 and a cylindrical support member 42 protruded from a lower surface of the outer periphery of the opening structure 41 and accommodated in the neck body 21. The opening structure 41 has a second opening 41a. The second opening 41a is a passage in an almost circular shape for insertion of the refueling nozzle and constitutes part of the fuel passage 11P.

(2)-2 Insertion-Side Open-Close Mechanism 50

Figure 3:
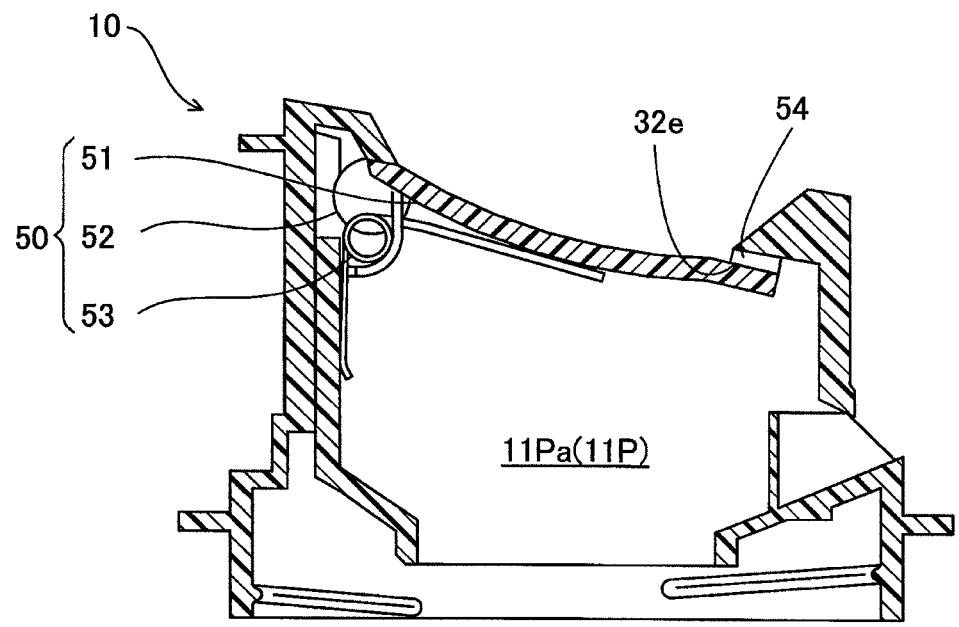
FIG. 3 is a partially exploded and enlarged cross sectional view illustrating an upper portion of the fueling device 10.
Figure 3:
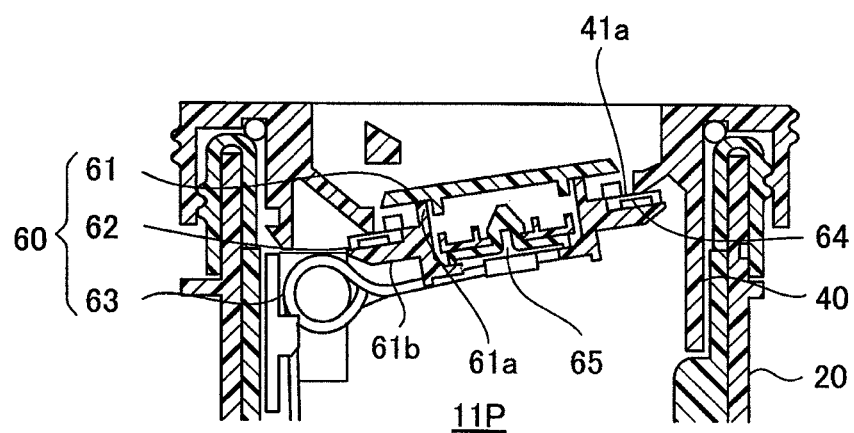

FIG. 3 is a partially exploded and enlarged cross sectional view illustrating an upper portion of the fueling device 10. The insertion-side open-close mechanism 50 includes a first open-close member 51, a bearing 52, and a spring 53 configured to press the first open-close member 51 in a closing direction. The first open-close member 51 is pressed by an edge of the refueling nozzle to rotate about the bearing 52 and thereby open the first opening 32e. A gasket 54 is placed around the periphery of the first opening 32e. The first open-close member 51 presses the gasket 54 to close the first opening 32e in the sealed state.

(2)-3 Filler Port Open-Close Mechanism 60

The filler port open-close mechanism 60 includes a second open-close member 61, a bearing 62 placed between the second open-close member 61 and the second opening-forming member 40 to support the second open-close member 61 in a rotatable manner relative to the second opening-forming member 40, a spring 63 configured to press the second open-close member 61 in a closing direction, a gasket 64 and a pressure regulator 65. The second open-close member 61 includes a pressing member 61a and a valve chest-forming member 61b to form a valve chest in which the pressure regulator 65 is accommodated. The gasket 64 is made of a rubber material and is formed in a ring shape. The gasket 64 is mounted on the outer periphery of the second open-close member 61 and is placed between the periphery of the second opening 41a of the second opening-forming member 40 and the outer periphery of the second open-close member 61 to close the second opening 41a in the sealed state. The pressure regulator 65 is accommodated in the valve chest and includes a positive pressure valve pressed by a spring. The pressure regulator 65 is a valve configured to open when the pressure in the fuel tank exceeds a specified pressure and thereby release the pressure in the fuel tank.

(2)-4 Assembling Structure of Respective Members

Figure 4:
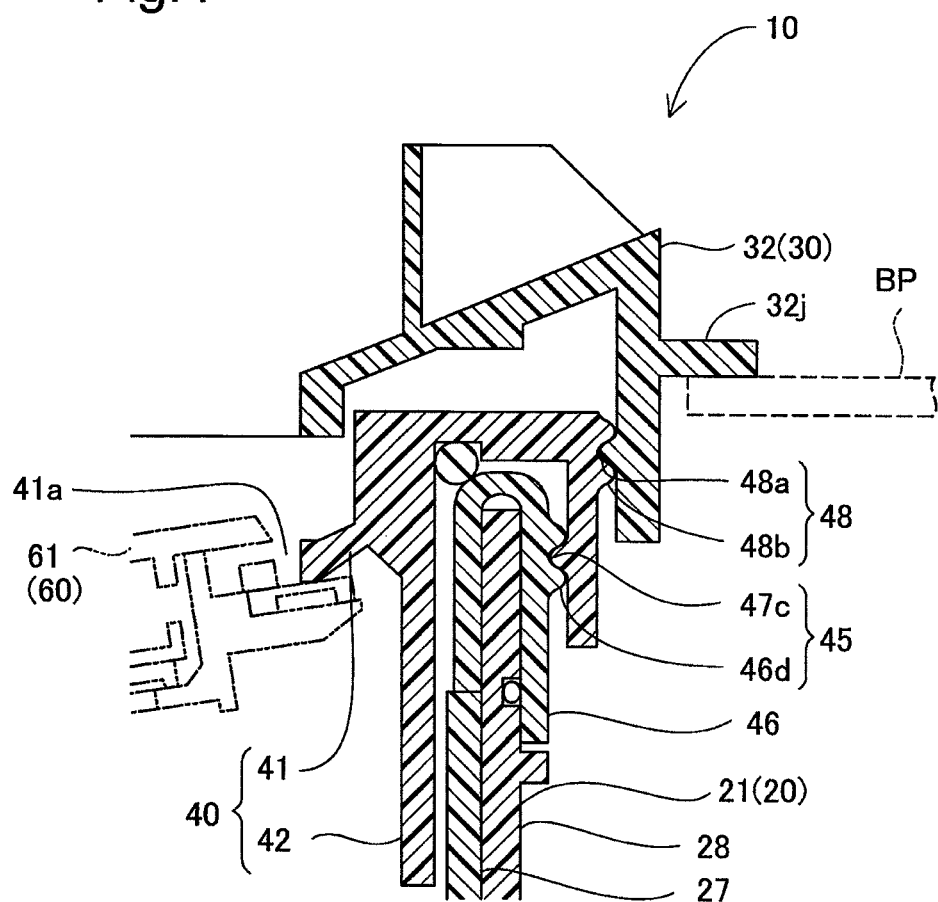
FIG. 4 is an enlarged cross sectional view illustrating the main part of the fueling device 10 of FIG. 1.
Figure 5:
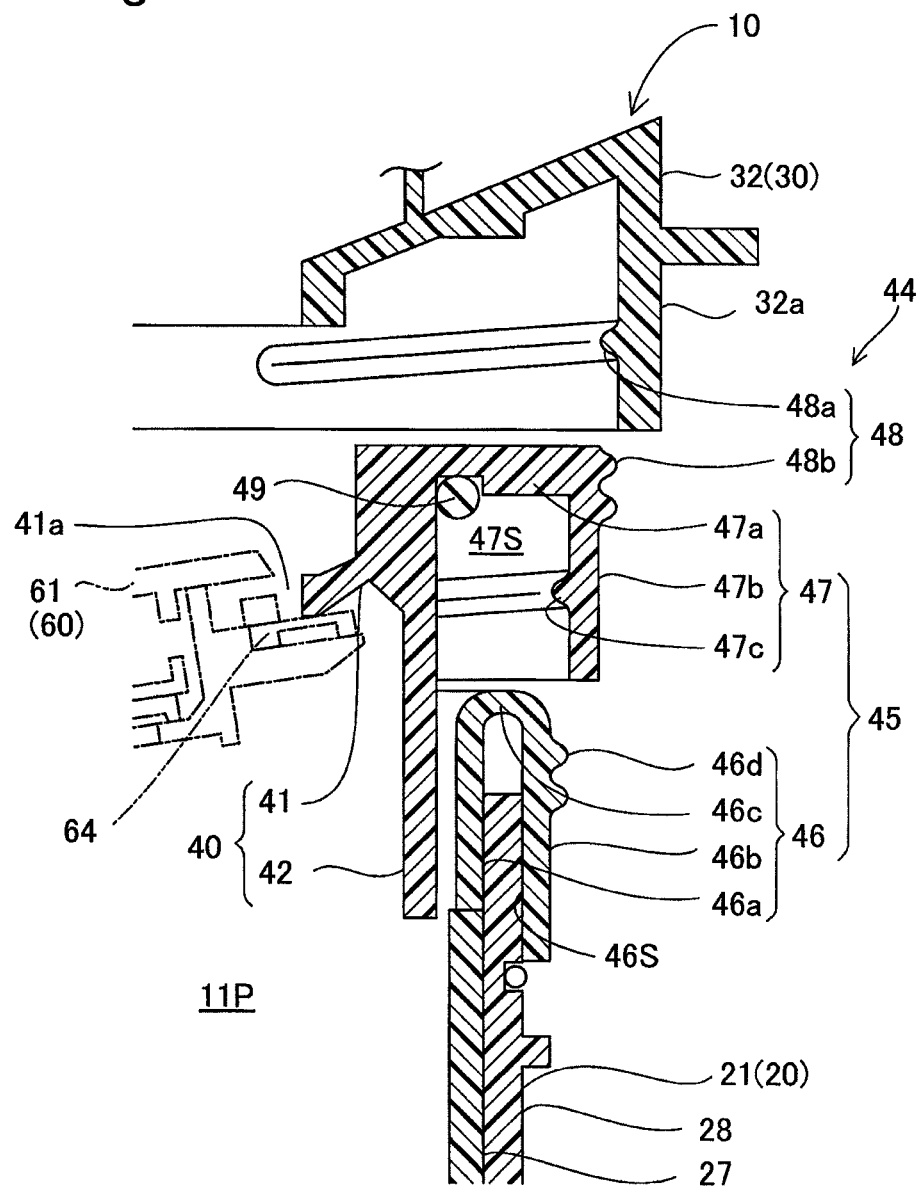
FIG. 5 is a cross sectional view illustrating the state that the first opening-forming member 30 and the second opening-forming member 40 are removed from the passage-forming member 20.

FIG. 4 is an enlarged cross sectional view illustrating the main part of the fueling device 10 of FIG. 1. FIG. 5 is a cross sectional view illustrating the state that the first opening-forming member 30 and the second opening-forming member 40 are removed from the passage-forming member 20. Referring to FIG. 5, a coupling mechanism 44 is formed on respective parts of the passage-forming member 20, the first opening-forming member 30 and the second opening-forming member 40 to screw these members 20, 30 and 40 together. The coupling mechanism 44 includes a first screwing mechanism 45 and a second screwing mechanism 48. The first screwing mechanism 45 is a mechanism to mount the second opening-forming member 40 on the passage-forming member 20. The second screwing mechanism 48 is a mechanism to mount the first opening-forming member 30 on the passage-forming member 20.

The first screwing mechanism 45 includes a thread-forming member 46 attached to the upper portion of the passage-forming member 20, and a threaded base section 47 formed on the second opening-forming member 40. The thread-forming member 46 is a member in a double cylindrical shape to mount the second opening-forming member 40 and the first opening-forming member 30. The thread-forming member 46 includes an inner wall 46 in a cylindrical shape, an outer wall 46b in a cylindrical shape arranged to be opposed to the inner wall 46a across the passage-forming member 20 and a joint section 46c configured to join an upper end of the inner wall 46a with an upper end of the outer wall 46b. A space surrounded by the inner wall 46a, the outer wall 46b and the joint section 46c forms a support recess 46S which the upper portion of the passage-forming member 20 is fit in. An outer circumferential threaded section 46d is formed on the outer periphery of the outer wall 46b to be protruded along the circumferential direction.

The threaded base section 47 is formed by expanding the diameter of the support member 42 of the second opening-forming member 40 from the upper portion toward the outer periphery. The threaded base section 47 includes a flange 47a, and an outer wall 47b extended from the outer periphery of the flange 47a and arranged in conjunction with the support member 42 to surround the thread-forming member 46. A space surrounded by the flange 47a and the outer wall 47b forms a support recess 47S. The thread-forming member 46 attached to the upper portion of the passage-forming member 20 is inserted into the support recess 47S. An inner circumferential threaded section 47c is formed on the inner periphery of the outer wall 47b. The inner circumferential threaded section 47c is formed to be screwed to the outer circumferential threaded section 46d of the thread-forming member 46. The outer circumferential threaded section 46d and the inner circumferential threaded section 47c may not necessarily be formed along the entire circumference but may be formed along only part of the circumferential direction as long as they are screwed to each other.

A gasket 49 as an O ring is received in the support recess 47S. The gasket 49 presses the outer periphery of the thread-forming member 46 to seal between the outside and the fuel passage 11P.

The second screwing mechanism 48 includes a threaded section 48a formed on a lower portion of the side wall section 32a of the first opening-forming member 30, and a threaded section 48b formed on the outer periphery of the threaded base section 47. The second screwing mechanism 48 causes the cover member 32 to be attached to the passage-forming member 20 via the thread-forming member 46.

As shown in FIG. 4, a mounting structure 32j in a flange shape is formed on the outer periphery of the first opening-forming member 30. The mounting structure 32j is fixed to an automobile body base plate BP by a fastening member such as bolt.

(3) Manufacturing Method of Fueling Device 10

The production method of the fueling device 10 produces the first opening-forming member 30, the second opening-forming member 40 and the thread-forming member 46 by injection molding. The passage-forming member 20 is produced from two different resin materials by two-color injection molding, blow molding or tube extrusion molding. A procedure of manufacturing the passage-forming member 20 by injection molding injects modified polyethylene as a first resin material to form the resin outer layer 28 and subsequently injects polyamide to form the resin inner layer 27. The modified polyethylene is a resin material made by adding a polar functional group, for example, a functional group modified with maleic acid, to polyethylene (PE) and is made to react with and adhere to polyamide (PA) by heat during injection molding. The resin inner layer 27 and the resin outer layer 28 are thus welded to and integrated with each other by such reaction and adhesion during two-color molding. A manufacturing procedure by blow molding produces the passage-forming member 20 using a parison formed by stacking two different resin materials. A manufacturing procedure by tube extrusion molding produces the passage-forming member 20 by stacking and extruding two different resin materials coaxially. The first opening-forming member 30 is produced by injection molding using polyethylene. The second opening-forming member 40 and the thread-forming member 46 are produced by injection molding using polyamide.

The manufacturing method then attaches the filler port open-close mechanism 60 to the second opening-forming member 40 and attaches the insertion-side open-close mechanism 50 to the first opening-forming member 30. The manufacturing method subsequently adjusts the position of the thread-forming member 46 relative to the upper portion of the passage-forming member 20 and fits the passage-forming member 20 in the support recess 46S, so as to mount the thread-forming member 46 on the passage-forming member 20. The second opening-forming member 40 preassembled with filler port open-close mechanism 60 is then mounted on the passage-forming member 20 via the first screwing mechanism 45. More specifically, the manufacturing method adjusts the position of the threaded base section 47 of the second opening-forming member 40 relative to the upper portion of the thread-forming member 46 and rotates the second opening-forming member 40 to screw the outer circumferential threaded section 46d into the inner circumferential threaded section 47c. This mounts the second opening-forming member 40 on the passage-forming member 20.

The first opening-forming member 30 is then mounted on the passage-forming member 20 via the second screwing mechanism 48. More specifically, the production method adjusts the position of the first opening-forming member 30 to cover over the upper portion of the thread-forming member 46 and rotates the first opening-forming member 30 to screw the threaded section 48a into the threaded section 48b of the second screwing mechanism 48. This assembles the first opening-forming member 30 with the passage-forming member 20.

(4) Functions and Advantageous Effects of Embodiment

The structure of the above embodiment has the following advantageous effects, in addition to the advantageous effects described above.

(4)-1: Referring to FIG. 5, the second opening-forming member 40 assembled with the filler port open-close mechanism 60 is screwed to the passage-forming member 20 via the first screwing mechanism 45. This structure enables the filler port open-close mechanism 60 with the second opening-forming member 40 to be readily removed from the passage-forming member 20, for example, in the event of a failure or a damage of the filler port open-close mechanism 60, while causing the filler port open-close mechanism 60 not to be readily detached under application of an external force by, for example, collision of a vehicle.

(4)-2: The second opening-forming member 40 assembled with the filler port open-close mechanism 60 is removably attached to the passage-forming member 20. The gasket 49 serves to seal the clearance between the second opening-forming member 40 and the passage-forming member 20. The sealing force of the gasket 49 is adjustable by the screwing amount of the first screwing mechanism 45. This arrangement ensures the high sealing property of the fuel passage 11P from the outside.

(4)-3: The thread-forming member 46 having the outer circumferential threaded section 46d of the first screwing mechanism 45 is provided as a separate member from the second opening-forming member 40 and the passage-forming member 20. The second opening-forming member 40 having the inner circumferential threaded section 47c of the first screwing mechanism 45 is also provided as a separate member from the passage-forming member 20. This enables the thread-forming member 46 and the second opening-forming member 40 to be readily formed with high accuracy by injection molding. The passage-forming member 20 does not have any threaded section and is thus producible at high productivity by a manufacturing technique such as blow molding or extrusion molding.

(4)-4: Referring to FIGS. 3 and 5, the first opening-forming member 30 assembled with the insertion-side open-close mechanism 50 is screwed to the passage-forming member 20 via the second screwing mechanism 48. This arrangement enables the insertion-side open-close mechanism 50 with the first opening-forming member 30 to be readily removed from the passage-forming member 20, for example, in the event of a failure or a damage of the insertion-side open-close mechanism 50.

(4)-5: Referring to FIG. 5, the upper portion of the passage-forming member 20 is fit in the thread-forming member 46 that constitutes part of the first screwing mechanism 45. This ensures secure attachment of the thread-forming member 46 to the passage-forming member 20. Additionally, the thread-forming member 46 is mechanically attached to the passage-forming member 20. This ensures secure attachment of even the resin material of the thread-forming member 46 which is not weldable to the material of the passage-forming member 20.

B. Second Embodiment

Figure 6:
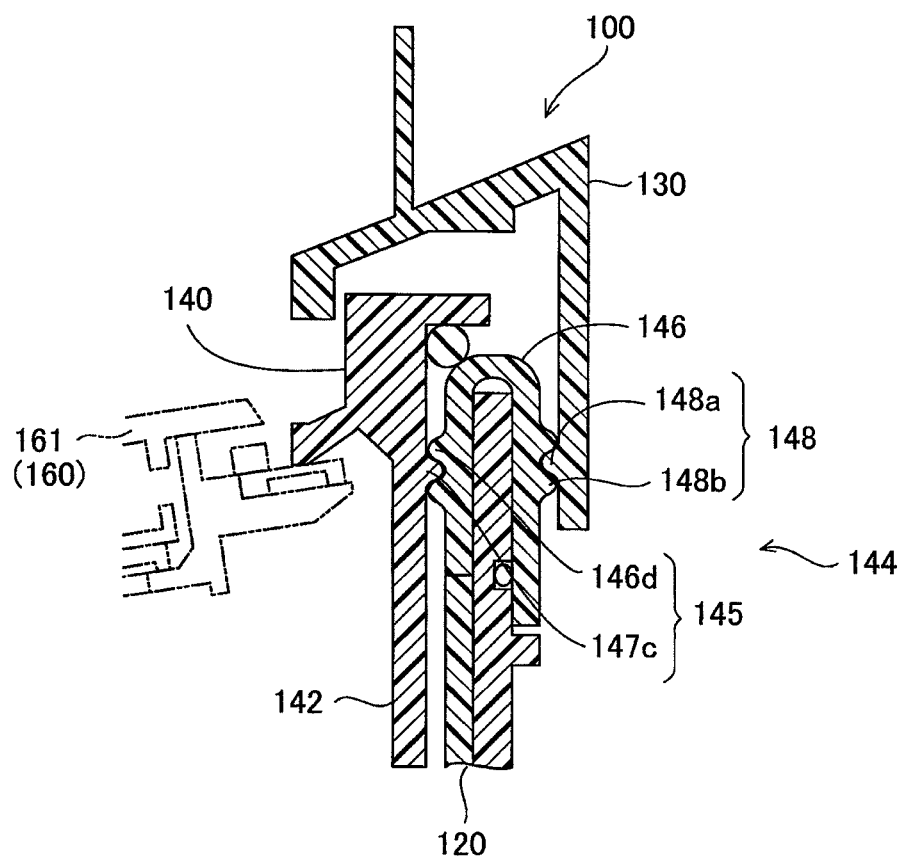
FIG. 6 is a cross sectional view illustrating a main part of a fueling device 100 according to a second embodiment.

FIG. 6 is a cross sectional view illustrating a main part of a fueling device 100 according to a second embodiment. This embodiment is characterized by the structures of a first screwing mechanism 145 and a second screwing mechanism 148. The second screwing mechanism 148 includes an inner circumferential threaded section 148a formed on a first opening-forming member 130, and an outer circumferential threaded section 148b formed on the outer periphery of a thread-forming member 146. A first opening-forming member 130 is attached to a passage-forming member 120 via the thread-forming member 146 by screwing the inner circumferential threaded section 148a to the outer circumferential threaded section 148b. The first screwing mechanism 145 includes a threaded section 146d formed on the inner periphery of the thread-forming member 146 and a threaded section 147c formed on a support member 142 of a second opening-forming member 140. The second opening-forming member 140 is attached to the passage-forming member 120 via the thread-forming member 146 by screwing the threaded section 146d to the threaded section 147c. The threaded sections of the first and the second screwing mechanisms 145 and 148 may be formed in any of various combinations between the passage-forming member 120, the second opening-forming member 140 and the thread-forming member 146.

C. Third Embodiment

Figure 7:
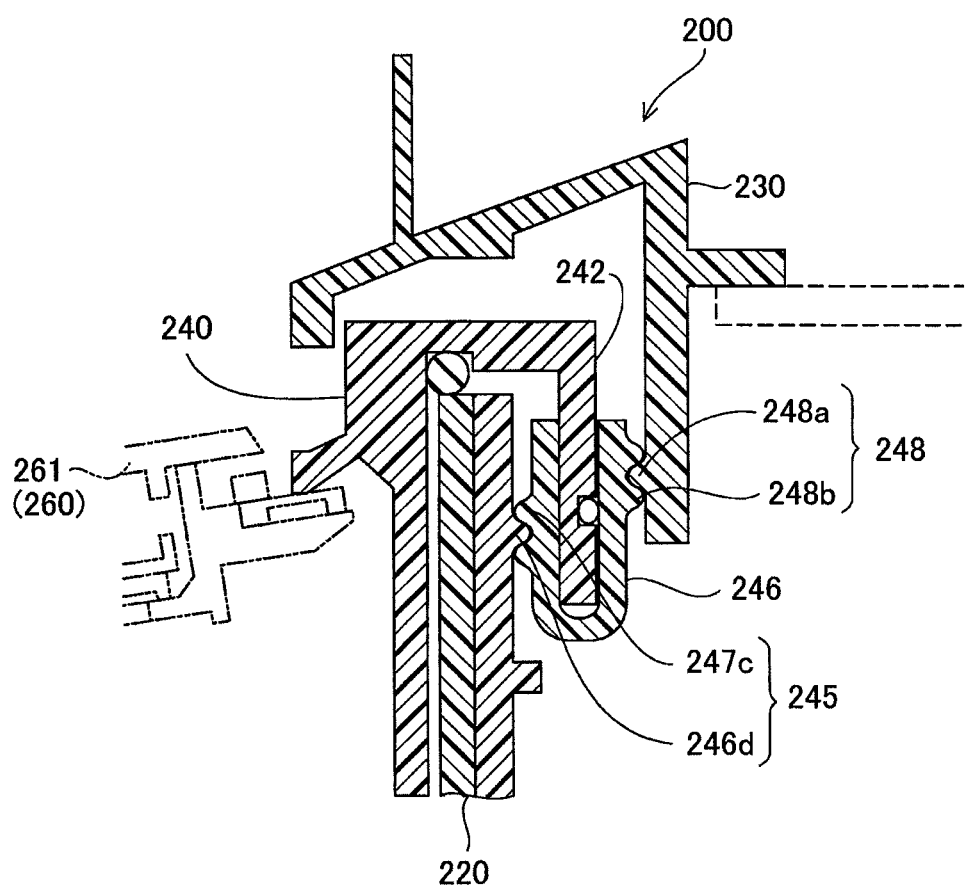
FIG. 7 is a cross sectional view illustrating a main part of a fueling device 200 according to a third embodiment.

FIG. 7 is a cross sectional view illustrating a main part of a fueling device 200 according to a third embodiment. This embodiment is characterized by the structures of a first screwing mechanism 245 and a second screwing mechanism 248. The first screwing mechanism 245 includes an outer circumferential threaded section 246d formed on the outer periphery of a passage-forming member 220, and an inner circumferential threaded section 247c formed on a thread-forming member 246 and screwed to the outer circumferential threaded section 246d. The thread-forming member 246 has a U-shaped cross section and is attached to a support member 242 of an opening-forming member 240. The second screwing mechanism 248 includes a threaded section 248a formed on a first opening-forming member 230 and a threaded section 248b formed on the thread-forming member 246. The threaded sections of the first and the second screwing mechanisms 245 and 248 may be formed in any of various combinations between the passage-forming member 220, the opening-forming member 240 and the thread-forming member 246.

D. Fourth Embodiment

Figure 8:
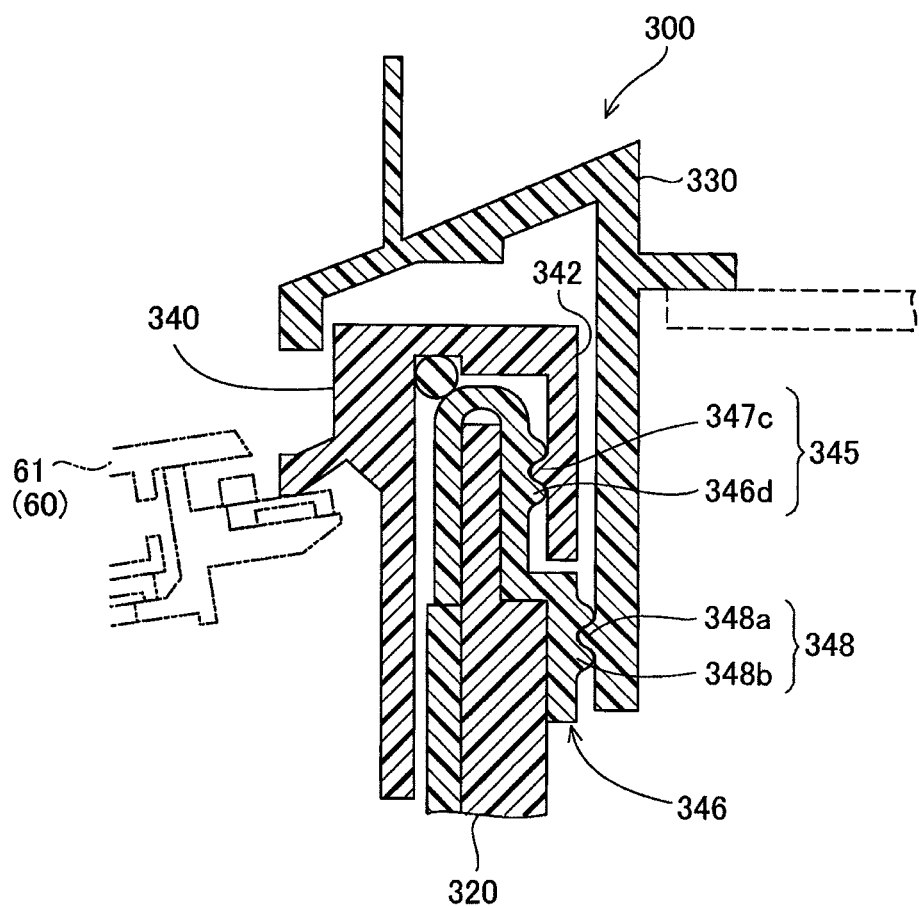
FIG. 8 is cross sectional view illustrating a main part of a fueling device 300 according to a fourth embodiment.

FIG. 8 is cross sectional view illustrating a main part of a fueling device 300 according to a fourth embodiment. This embodiment is characterized by the structures of a first screwing mechanism 345 and a second screwing mechanism 348. The first screwing mechanism 345 includes a threaded section 346d formed on the outer periphery of a thread-forming member 346, and a threaded section 347c formed on a support member 342 of a second opening-forming member 340. The second opening-forming member 340 is attached to a passage-forming member 320 via the thread-forming member 346 by screwing the threaded section 347c to the threaded section 346d. The second screwing mechanism 348 includes an inner circumferential threaded section 348a formed on a first opening-forming member 330, and a threaded section 348b formed on the outer periphery of the thread-forming member 346. The first opening-forming member 330 is attached to the passage-forming member 320 via the thread-forming member 346 by screwing the inner circumferential threaded section 348a to the threaded section 348b. As described above, in this embodiment, the threaded section 348b screwed to the inner circumferential threaded section 348a of the first opening-forming member 330 and the threaded section 346d screwed to the threaded section 347c of the second opening-forming member 340 are both formed on the outer periphery of the thread-forming member 346. The threaded sections of the first and the second screwing mechanisms 345 and 348 may be formed in any of various combinations between the first opening-forming member 330, the second opening-forming member 340 and the thread-forming member 346.

E. Fifth Embodiment

Figure 9:
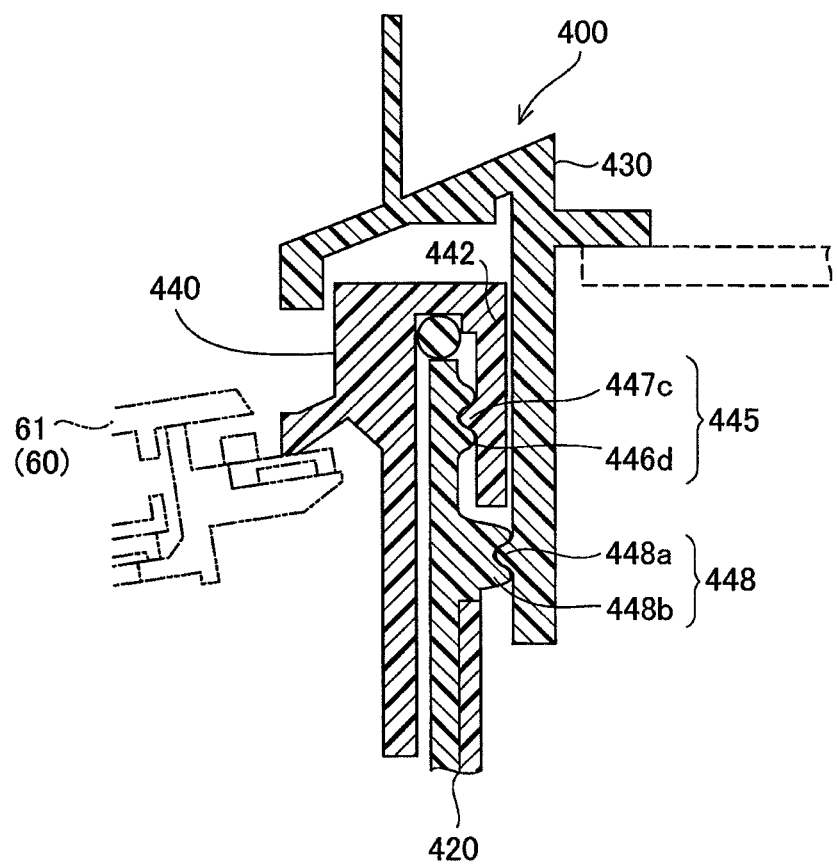
FIG. 9 is a cross sectional view illustrating a main part of a fueling device 400 according to a fifth embodiment.

FIG. 9 is a cross sectional view illustrating a main part of a fueling device 400 according to a fifth embodiment. This embodiment is characterized by the structures of a first screwing mechanism 445 and a second screwing mechanism 448. A thread-forming member is omitted from the structure of this embodiment. The first screwing mechanism 445 includes a threaded section 446d formed on the outer periphery of a passage-forming member 420, and a threaded section 447c formed on a support member 442 of a second opening-forming member 440. The second opening-forming member 440 is directly attached to the passage-forming member 420 by screwing the threaded section 447c to the threaded section 446d. The second screwing mechanism 448 includes an inner circumferential threaded section 448a formed on a first opening-forming member 430, and a threaded section 448b formed on the outer periphery of the passage-forming member 420. The first opening-forming member 430 is directly attached to the passage-forming member 420 by screwing the inner circumferential threaded section 448a to the threaded section 448b. As described above, in this embodiment, the threaded section 448b screwed to the inner circumferential threaded section 448a of the first opening-forming member 430 and the threaded section 446d screwed to the threaded section 447c of the second opening-forming member 440 are both formed on the outer periphery of the passage-forming member 420. The threaded sections of the first and the second screwing mechanisms 445 and 448 may be formed in any of various combinations between the passage-forming member 420, the first opening-forming member 430 and the second opening-forming member 440.

The invention is not limited to the above embodiments, examples or modifications, but a diversity of variations and modifications may be made to the embodiments without departing from the scope of the invention.

In the above embodiments, the passage-forming member is manufactured by stacking two layers made of two different resin materials. This structure is, however, not restrictive. The passage-forming member may be a single-layered structure, and a thread-forming member may be provided at an end of this single-layered structure.

In the above embodiments, the thread-forming member is manufactured from an injection molded member separately from the passage-forming member. This is, however, not restrictive. The thread-forming member may be manufactured by press-forming a metal thin plate. This latter application readily increases the surface accuracy of the thread-forming member and enhances the sealing property to the gasket. The thread-forming member may have a U-shaped resin main body made of a resin material and a seal surface located at a position that is in contact with the gasket and formed by integrating a metal thin plate with the resin main body by, for example, insert molding.

The above embodiments have the first opening-forming member and the second opening-forming member as the opening-forming member. The invention is, however, also applicable to the configuration that at least one of the first opening-forming member and the second opening-forming member is screwed to a single or a plurality of outer circumferential threaded sections provided on the passage-forming member, so as to be attached to the passage-forming member. The outer circumferential threaded section formed on the outer periphery of the passage-forming member may be formed integrally with the passage-forming member or alternatively may be provided on another member. The invention may further have a separate member configured to open and close the opening of the fuel passage, in addition to the structure that the opening-forming member is screwed to the outer circumferential threaded section provided on the outer periphery of the passage-forming member. This separate member may be attached to the passage-forming member via a threaded section provided on the inner periphery of the passage-forming member, or may be fixed to the passage-forming member by welding or by engagement using, for example, claws.

What is claimed is:

1. A fueling device configured to supply fuel to a fuel tank, comprising:
    a passage-forming member configured to form a fuel passage connected with the fuel tank, the passage-forming member including an upper portion and a lower portion;
    an opening-forming member that is configured to form an opening that constitutes part of the fuel passage, that is arranged to cover the passage-forming member, and that includes a first opening-forming member and a second opening-forming member, the first opening-forming member is arranged to cover the second opening-forming member;
    a filler port open-close mechanism attached to the opening-forming member in an openable and closable manner, the filler port open-close mechanism including an open-close member configured to open and close the opening;
    a screwing mechanism that includes an outer circumferential threaded section, an inner circumferential threaded section, and a thread-forming member that forms the outer circumferential threaded section and that attaches to the passage-forming member to cover the upper portion of the passage-forming member; and
    a gasket placed between the opening-forming member and the passage-forming member to seal between the opening-forming member and the passage-forming member, the gasket contacts both the thread-forming member of the screwing mechanism and the second opening-forming member and is attached to the thread-forming member to seal between the opening-forming member and the passage-forming member, wherein
    the outer circumferential threaded section is provided on an outer periphery of the passage-forming member,
    the inner circumferential threaded section is provided on the opening-forming member and screwed to the outer circumferential threaded section of the passage-forming member, and
    the opening-forming member is attached to the passage-forming member by screwing the outer circumferential threaded section of the passage-forming member to the inner circumferential threaded section of the opening-forming member.

2. The fueling device according to claim 1, further comprising:
    a thread-forming member attached to the passage-forming member, wherein
    the thread-forming member has the outer circumferential threaded section.

3. The fueling device according to claim 1, further comprising:
    a thread-forming member attached to the opening-forming member, wherein
    the thread-forming member has the inner circumferential threaded section.

4. The fueling device according to claim 1, wherein
    the first opening-forming member has a threaded section that is provided on a lower portion of the first opening-forming member and is screwed to either the passage-forming member or the second opening-forming member.

5. The fueling device according to claim 1, further comprising:
    a thread-forming member attached to either the passage-forming member or the second opening-forming member, wherein
    the thread-forming member is screwed to the passage-forming member or the second opening-forming member, and
    the first opening-forming member has a threaded section that is provided on a lower portion of the first opening-forming member and is screwed to the thread-forming member.

6. The fueling device according to claim 2, wherein
    the thread-forming member attached to the passage-forming member further includes an inner cylindrical wall, an outer cylindrical wall arranged to be opposed to the inner cylindrical wall across the passage-forming member, and a joint section configured to join an upper end of the inner cylindrical wall with an upper end of the outer cylindrical wall.

7. The fueling device according to claim 1, wherein the gasket is placed around the upper end of the passage-forming member.

8. The fueling device according to claim 1, wherein the second opening-forming member covers and surrounds the passage-forming member to form an inner seal, and
the first opening-forming member covers and surrounds the second opening-forming member to form an outer seal.

9. The fueling device according to claim 1, wherein the first opening-forming member includes a mounting structure that extends outwardly to mount the opening-forming member to a body plate of a vehicle,
the second opening-forming member includes an opening structure that extends inwardly to hold and retain the filler port opening-close mechanism, and includes the inner circumferential threaded section, and
the second opening-forming member outwardly extends above and around a top of the passage-forming member so that the inner circumferential threaded section of the second opening-forming member mates with the outer circumferential threaded section of the passage-forming member to form an inner seal, and
the first opening-forming member outwardly extends beyond the second opening-forming member and the passage-forming member above and around a top of the second opening-forming member and mates with the second opening-forming member to form an outer seal.

10. The fueling device according to claim 1, wherein the gasket contacts the thread-forming member and the second opening-forming member without contacting the passage-forming member.

* * * * *